Patented Sept. 25, 1951

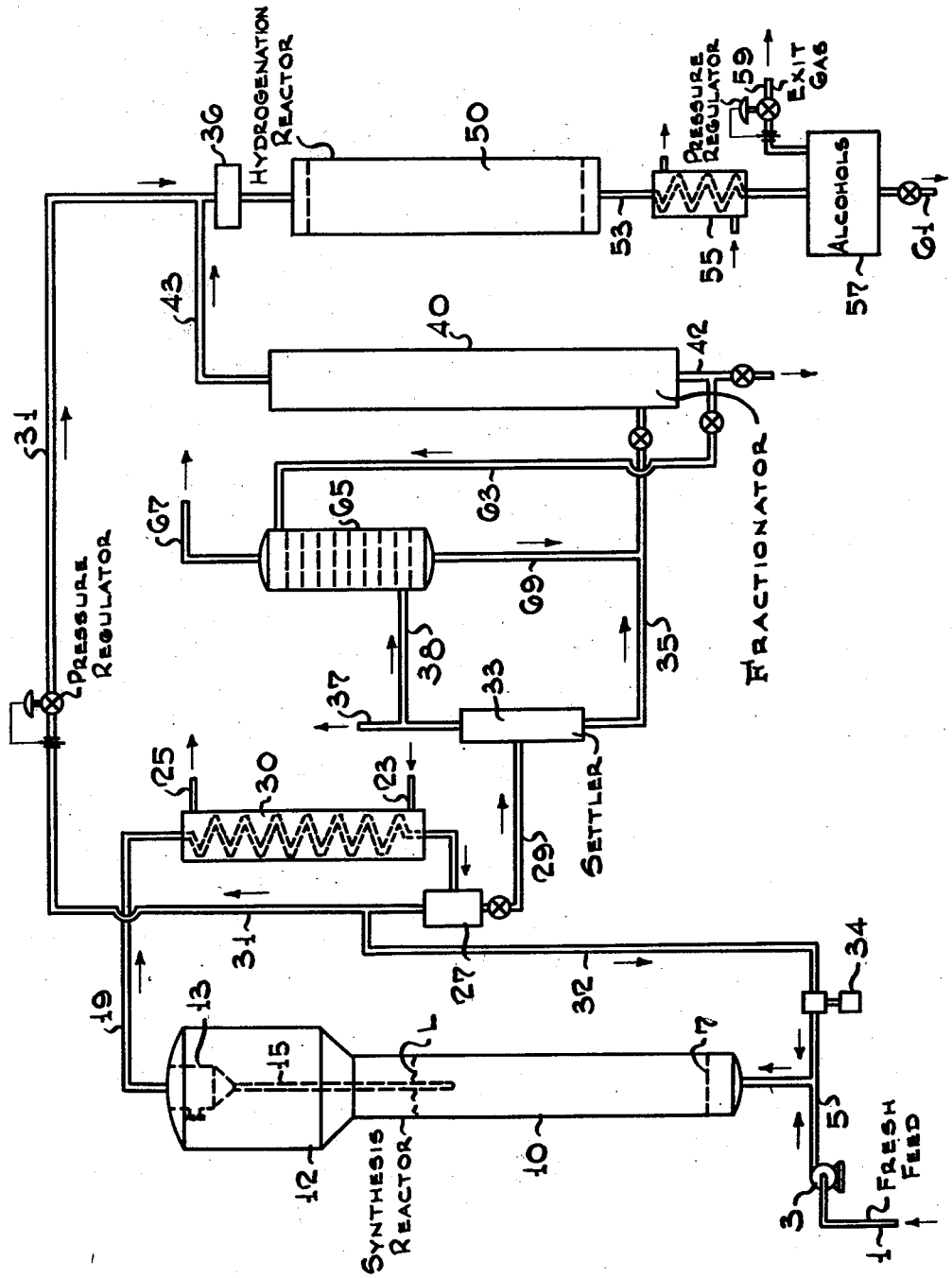

2,569,380

UNITED STATES PATENT OFFICE 2,569,380

PRODUCTION OF ALCOHOLS FROM CARBON MONOXIDE AND HYDROGEN

Clinton H. Holder, Cranford, N. J., assignor to Standard Oil Development Company, a corporation of Delaware Application June 11, 1946, Serial No. 676,077

15 Claims. (Cl. 260—449.5)

This invention relates to the production of alcohols from carbon monoxide and hydrogen. More particularly the invention is concerned with the production of alcohols from oxygenated compounds formed in the course of the catalytic synthesis of hydrocarbons from carbon monoxide and hydrogen.

It is known in the art that the catalytic synthesis of hydrocarbon oils from carbon monoxide and hydrogen produces substantial proportions of oxygenated organic compounds varying in amounts from fractions of one percent to as much as 30 and 50% of the liquid yield depending on the catalyst, feed gas composition and reaction conditions involved. These oxygenated compounds which comprise various alcohols, aldehydes, ketones, acids and esters are found distributed between the product water and oil layers of the first product condensate of the conventional hydrocarbon synthesis. They have considerable commercial value and their recovery by economic methods may improve substantially the economic aspects of the hydrocarbon synthesis. Particularly alcohols such as ethyl and isopropyl alcohol are of greatest technical and commercial interest. However, the oxygenated organic product of the hydrocarbon synthesis contains a relatively high proportion of more highly oxygenated compounds of lesser value such as aldehydes and ketones normally in amounts of about 15–40% and acids amounting usually to about 5–25%. The conversion of these compounds into more valuable alcohols by simple and inexpensive means presents an important problem. The present invention refers to a new process designed to permit such conversion as will appear from the following description thereof read with reference to the accompanying drawing.

It is, therefore, the principal object of my invention to provide an improved process for increasing the alcohol yield of the catalytic synthesis of hydrocarbons from carbon monoxide and hydrogen.

Another object of my invention is to provide a new and inexpensive method for producing alcohols from more highly oxygenated products of the catalytic hydrocarbon synthesis from carbon monoxide and hydrogen.

Other and further objects and advantages will appear hereinafter.

I have found that these objects may be accomplished by hydrogenating the oxygenated product of the hydrocarbon synthesis in the presence of conventional hydrogenation catalysts with synthesis tail gas which is rich in hydrogen. In the course of the hydrogenation reaction the aldehydes and ketones and small proportions of the acids are converted into alcohols with the result that the total alcohol yield of the synthesis process is increased by about 20–40% and the recovery and purification of the synthetic alcohols is simultaneously greatly simplified. Alcohols and acids (largely acetic acid) thus become the sole oxygenated products resulting from the hydrocarbon synthesis operation.

In carrying out my invention I may contact the entire aqueous condensate of the synthesis product with the synthesis tail gas after separation from the hydrocarbon phase. However, in order to improve the efficiency of the hydrogenation stage of my process, it is desirable to concentrate the oxygenated product by suitable methods such as distillation or solvent extraction. It is also desirable to recover the oxygenated products from the oil phase to as great an extent as possible and to combine these with those found in the water phase for subsequent hydrogenation treatment. The oxygenated compounds in the oil phase may be recovered by solvent extraction using such solvents as water, phosphoric acid, ethylene glycol, dibutyl phthalate, or the like, in a manner known per se.

In accordance with a preferred embodiment of my invention the oxygenated compounds are removed from the aqueous condensate of the synthesis product by distillation or solvent extraction, at least a portion of the water remaining after the removal of the oxygenated products from the aqueous condensate is used for an extraction of the liquid hydrocarbon product, preferably in several stages, to recover additional amounts of oxygenated compounds, the extract is combined with the aqueous condensate of the synthesis product, the total oxygenated compounds are separated and passed to the hydrogenation stage whereby the alcohol yield of the process is materially increased. The effluent from the hydrogenation zone is thus largely alcohols and their separation may be accomplished by inexpensive means such as simple distillation.

The conditions of the hydrogenation reaction may be those known in the art of hydrogenating oxygenated organic compounds. For example conventional hydrogenation catalysts such as nickel, nickel sulfide-tungsten sulfide, chromium oxide, molybdenum oxide, platinum, etc. may be used in vapor phase operation at temperatures within the range of about 400°–700° F., and pressures ranging from 1 to 50 atmospheres or more depending on the catalyst employed. I have found that synthesis tail gas which normally contains about 35–60% of hydrogen together with about 10–25% of $CO_2$, 1–5% of CO, and about 25–45% of normally gaseous hydrocarbons is a highly useful hydrogenating agent at these conditions and that its diluting constituents do not appreciably interfere with the hydrogenation reaction.

Having set forth the general nature and object, my invention will be best understood from the more detailed description hereinafter, in which reference will be made to the accompanying drawing which shows a semi-diagrammatic view of a system suitable to practice a preferred embodiment of the invention.

Referring now in detail to the drawing the system illustrated therein essentially comprises a synthesis reactor 10, a product condenser 30, a water phase fractionator 40 and a hydrogenation reactor 50, the functions and cooperation of which will be forthwith explained.

Synthesis reactor 10 contains synthesis catalyst of any suitable composition known in the art of hydrocarbon synthesis, such as reduced oxides of cobalt or iron supported, if desired, on carrier materials such as kieselguhr, silica gel, magnesia, etc. and containing small amounts of suitable promoters. Best results with respect to the formation of oxygenated compounds are obtained with reduced iron oxides promoted with alkali promoters such as carbonates or fluorides of alkali metals, particularly of potassium. While the catalyst may be employed in the form of a fixed bed, I prefer a so-called fluid operation which affords considerable advantages with respect to temperature control and equipment design.

In accordance with the preferred embodiment of the invention, therefore, synthesis reactor 10 is charged with a finely divided alkali-promoted iron catalyst having a particle size of from 100–400 mesh, preferably about 200 mesh. The synthesis gas mixture which may have a molar ratio of hydrogen to carbon monoxide varying between the approximate limits of 0.5–3:1 and preferably between about 1:1 and 2:1, is fed from line 1 by compressor 3 through line 5 to the catalyst zone of reactor 10 and enters the latter through a distribution plate 7 at a velocity controlled within the limits of from 0.1–3 ft. per second, preferably about 0.4–1.0 ft. per second so as to maintain the catalyst in the form of a dense, highly turbulent, fluidized mass having a well-defined upper level L. The pressure within reactor 10 is preferably maintained within the approximate limits of 150 to 500 lbs. per sq. in. gage. Due to the phenomenon of hindered settling of catalyst particles, only a small proportion of the powdered catalyst is carried into enlarged zone 12 above level L, which serves as a catalyst disengaging zone. Catalyst particles passing into zone 12 are separated from the reaction products in a conventional gas-solids separator 13 and returned to the catalyst zone of reactor 10 through pipe 15. As a result of the excellent heat-transfer characteristics of the fluidized catalyst mass in reactor 10 the reaction temperature may be easily kept constant within a few degrees F. at the desired level which, for the purpose of my invention, lies between the approximate limits of 550° and 650° F. Surplus heat of the exothermic reaction may be withdrawn, and heat required for starting up the process may be supplied by any conventional means (not shown).

Product vapors and gases are withdrawn overhead from reactor 10 and passed through line 19 into product condenser 20 which is cooled to about atmospheric temperature by any suitable cooling agent such as water supplied through line 23 and withdrawn through line 25. Condensed products and uncondensed gases pass to a liquid product accumulator 27 wherein the liquid is separated from the gas. The liquid is withdrawn from the bottom of accumulator 27 through line 29 and the gas leaves accumulator 27 overhead through line 31, both to be further treated as will appear hereinafter. Frequently it is desirable to recycle a portion of the synthesis tail gas for purposes of fluidization and its cooling effect. This is done through line 32 by means of compressor 34.

Liquid product containing about 35 to 65% of hydrocarbons, 65 to 35% of water and about 20 to 45% of oxygenated compounds, based on the hydrocarbons, including alcohols, aldehydes, ketones and acids passes through line 29 to a settler 33 wherein the relatively light oil phase is separated from the relatively heavy water phase containing most of the oxygenated products. The oil phase is withdrawn overhead through line 37 for product recovery or to be further treated as described below.

The water phase containing the oxygenated products is withdrawn downwardly from a lower portion of settler 33 and passed through line 35 into a fractionation column 40. In column 40, the oxygenated products are concentrated to a water content of preferably less than about 10%. The concentrated oxygenated products are withdrawn as overhead vapors from column 40 and passed through line 43 to line 31 in which they are mixed with synthesis tail gas from accumulator 27 and passed to hydrogenation reactor 50.

The relative amounts of synthesis tail gas and oxygenated product vapors are preferably so chosen that there is an appreciable excess of hydrogen available in reactor 50 over that required for complete hydrogenation of aldehydes and ketones to alcohols. This may be readily accomplished by supplying the total amount of tail gas obtained in conventional synthesis operation, although in some cases only a portion of this gas may be necessary. For example when about 40 c. c. of oxygenated products per normal cu. m. of fresh synthesis gas are produced in the synthesis reaction, which contain about 30% of oxygenated products reducible to alcohol, the amount of hydrogen required to convert these oxygenated products, calculated as aldehyde, to alcohols is about 0.01 normal cu. m. of $H_2$ or about 2% of the hydrogen fed with the fresh synthesis gas having a hydrogen to carbon monoxide ratio of about 1:1. Hence, an excess of hydrogen will be available in the tail gas as long as hydrogen conversion in the synthesis reaction is below 98% which is the case in conventional operation. It will be desirable to pass sufficient tail gas to hydrogenation reactor 50, if desired, after preheating to temperatures of about 300°–500° F. in heater 36, to maintain a hydrogen supply of about 2 to 10 mols per mol of oxygenated product to be hydrogenated.

Hydrogen reactor 50 may be either of the conventional fixed bed or fluid type. The drawing shows a fixed bed reactor containing a bed of conventional hydrogenation catalyst, preferably nickel on kieselguhr. The vapor-gas mixtures to be reacted passes downwardly through reactor 50 at a temperature of about 400° to 600° F., preferably about 450° F., a pressure of about 50 to 250 p. s. i., preferably about 150 p. s. i., and a space velocity of about 0.5 to 5.0 v./v./hr., preferably about 1.0 v./v./hr. At these conditions about 85 to 98% of the aldehydes and ketones and about 2 to 10% of the acids are reduced to alcohols.

The hydrogenated product together with spent tail gas leaves reactor 50 through line 53 provided with product cooler 55 and enters accumulator 57 where it is separated from spent gas which may be vented or passed to any desired use through line 59. Pressure is controlled by a regulator on line 59. A mixture of alcohols and minor proportions of acids amounting to about 80% alcohols and 20% acids may be recovered from accumulator 57 through line 61.

Returning now to fractionation column 40 it is pointed out that the residual water which remains after the oxygenated compounds have been distilled off, and which may still contain a small concentration of oxygenated compounds, may be withdrawn from the bottom portion of column 40 and discarded through line 42. In accordance with the preferred embodiment of my invention, however, all or a substantial proportion of this water may be used to extract the oil phase withdrawn from the top of settler 33 to recover and make available for hydrogenation further amounts of oxygenated compounds. For this purpose, residual water is branched off from line 42 and passed through line 63 to the top of an extraction column 65 wherein it passes downwardly countercurrent to product oil supplied to the bottom of column 65 from separator 33 through line 38. Product oil substantially free of oxygenated compounds is recovered overhead from column 65 through line 67, while water enriched with oxygenated compounds leaves the bottom portion of column 65 through line 69 to be reunited with the original aqueous phase in line 35. In this manner the loss of oxygenated compounds to the product oil or with discarded residual water is substantially avoided.

The embodiment of my invention illustrated by the drawing permits of numerous modifications. Thus the extent to which the loss of oxygenated compounds to the product oil or discarded water is avoided depends upon the molecular weight of the oxygenated compounds being produced which in turn is a function of operating conditions and catalyst. For this reason it may be desirable in certain cases to insert a secondary distillation zone in line 63 in order to take substantially pure water overhead to be passed to extraction zone 65 and collect the high boiling oxygenated products from the bottom to be hydrogenated in reactor 50 or in a separate hydrogenation zone. When contacting the oil stream with water as mentioned and operating two distillation zones, about 75% of the total oxygenated product may be recovered as an overhead stream from the initial distillation zone, while the balance of 25% may be recovered from the bottom of the secondary zone.

Instead of using a single stage extraction zone 65 a multistage extraction system may be provided in a manner known per se. It is also noted that the fractionation column 40 may be replaced by a single or multistage selective solvent extraction system if the character and relative proportions of oxygenated compounds makes this change appear feasible or technically advisable. In this case it is advisable to subject the solvent extract to a suitable distillation treatment in order to obtain the oxygenated synthesis products in concentrated form suitable for hydrogenation.

As mentioned before, synthesis reactor 10 may be a fixed bed reactor rather than a fluid reactor and hydrogenation reactor 50 may be a fluid rather than a fixed bed reactor. Design and operation of fluid and fixed bed reactors for the purposes here involved are well known in the art and need not be described in detail beyond the explanations given above. Other modifications within the scope of my invention will appear to those skilled in the art.

My invention will be further illustrated by the following specific example.

EXAMPLE

*Production of oxygenated compounds during hydrocarbon synthesis over a reduced iron catalyst promoted with 1.5% $K_2CO_3$*

SYNTHESIS CONDITIONS

| | |
|---|---|
| Temperature | 650° F. |
| Pressure | 250#/sq. in. |
| Throughput | 5150 v./v./hr.[1] |
| Recycle/fresh feed ratio | 1.3:1 |
| $H_2$/CO fresh feed ratio | 2:1 |
| Superficial inlet velocity | 0.2 ft./sec. |

[1] Equivalent to 46 CF of synthesis gas/# of iron/hr.

YIELDS—CC./M.³ OF CONVERTED FEED

| | |
|---|---|
| $C_4$+oil | 187 |
| $C_3$+oil | 230 |
| Oil "as collected" | 154 |
| Water layer | 273 |
| Oxygenated compounds in $H_2O$ | 27 |
| Oxygenated compounds in oil | 21 |
| Total oxygenated compounds | 48 |
| $H_2$ conversion—vol. per cent | 94 |
| CO conversion—vol. per cent | 99 |
| $H_2$+CO conversion—vol. per cent | 95 |
| $H_2$/CO consumption ratio | 1.9 |

DISTRIBUTION OF OXYGENATED PRODUCTS IN OIL AND WATER PHASES

| | cc./m.³ of Conv. Feed Gas | Volume Per Cent Distribution |
|---|---|---|
| Alcohols | 23.2 | 48.4 |
| Acids | 5.6 | 11.6 |
| Aldehydes and Ketones | 14.1 | 29.3 |
| Esters | 5.1 | 10.7 |
| Total | 48.0 | 100.0 |

TAIL GAS COMPOSITION—VOL. PER CENT

| | |
|---|---|
| $CO_2$ | 7.8 |
| CO | 1.0 |
| $H_2$ | 35.4 |
| $N_2$ | 4.5 |
| $C_1$ | 29.2 |
| $C_2$ | 8.3 |
| $C_3$ | 8.1 |
| $C_4$ | 3.9 |
| $C_5$+ | 1.8 |

CONDITIONS FOR HYDROGENATING OXYGENATED PRODUCT

| | |
|---|---|
| Catalyst | Nickel on kieselguhr. |
| Temperature | 450° F. |
| Pressure | 150 p. s. i. |
| Throughput | 1.0 v./v./hr. |
| Total synthesis tail gas feed | 1570 CF/bbl. of oxygenated product (or 6.5 mols of $H_2$/mol of aldehydes and ketones) |

FINAL YIELDS OF TOTAL RECOVERED OXYGENATED PRODUCT AFTER HYDROGENATION

|  | cc./m.³ of Conv. Feed | Volume Per Cent Distribution |
|---|---|---|
| Alcohols | 32.1 | 75.2 |
| Acids | 5.0 | 11.8 |
| Aldehydes and Ketones | 1.0 | 2.4 |
| Esters | 4.5 | 10.6 |
| Total | 42.6 | 100.0 |

The above data show an increase of the alcohol yield by about 40% for the process of my invention as compared with the conventional direct recovery of the alcohols from the synthesis product. At the conditions specified the alcohols recovered contain about 50–60% of ethyl alcohol, 15–20% of propyl alcohols and 20–35% of butyl and higher alcohols.

While the foregoing description and exemplary operations have served to illustrate specific applications and results of my invention, other modifications obvious to those skilled in the art are within the scope of my invention. Only such limitations should be imposed on my invention as are indicated in the appended claims.

I claim:

1. The process of producing alcohols from carbon monoxide and hydrogen which comprises contacting a gas mixture containing carbon monoxide and hydrogen in synthesis proportions at synthesis conditions with a synthesis catalyst to produce major proportions of normally liquid hydrocarbons, minor proportions of oxygenated organic compounds, and a spent synthesis gas rich in hydrogen separating normally liquid hydrocarbons and oxygenated compounds from said spent synthesis gas, separating normally liquid hydrocarbons from oxygenated organic compounds, hydrogenating the separated oxygenated organic compounds with separated spent synthesis gas in the presence of a hydrogenation catalyst at hydrogenation conditions to produce alcohols from more highly oxygenated organic compounds, and recovering alcohols from the hydrogenated product.

2. In the production of alcohols by the catalytic conversion of carbon monoxide with hydrogen to form major proportions of normally liquid hydrocarbons, minor proportions of oxygenated compounds, and a spent synthesis gas rich in hydrogen, the improvement which comprises hydrogenating the oxygenated compounds with hydrogen-containing spent synthesis gas in the presence of a hydrogenating catalyst and recovering alcohols from the hydrogenated product.

3. The process as claimed in claim 1 wherein the oxygenated compounds are separated from water formed in the synthesis reaction prior to hydrogenation.

4. The process as claimed in claim 1 wherein the oxygenated compounds are separated by distillation from water formed in the synthesis reaction prior to hydrogenation.

5. The process as claimed in claim 1 wherein the oxygenated compounds are separated by solvent extraction from water formed in the synthesis reaction, prior to hydrogenation.

6. The process as claimed in claim 1 wherein the separated normally liquid hydrocarbons are extracted with water to remove oxygenated compounds therefrom and the oxygenated compounds thus removed are combined with said separated oxygenated compounds prior to hydrogenation.

7. The process as claimed in claim 1 wherein the separated oxygenated organic compounds are separated from water formed in the synthesis reaction prior to hydrogenation, the water thus obtained is intimately contacted with said separated normally liquid hydrocarbons to remove oxygenated organic compounds therefrom and the oxygenated organic compounds thus removed are combined with said separated oxygenated organic compounds prior to hydrogenation.

8. The process as claimed in claim 2 wherein the synthesis catalyst is present in the form of a dense turbulent mass of finely divided solids fluidized by a gas.

9. The process as claimed in claim 2 wherein the hydrogenation catalyst is present in the form of a dense turbulent mass of finely divided solids fluidized by a gas.

10. The process as claimed in claim 2 wherein the synthesis is carried out in the presence of a catalyst consisting essentially of a reduced iron oxide promoted by a small amount of an alkali compound promoter.

11. The process as claimed in claim 2 wherein the synthesis is carried out in the presence of a catalyst consisting essentially of a reduced iron oxide promoted by a small amount of an alkali compound promoter at a temperature of about 550 to 650° F., a pressure of about 150 to 500 lbs. per sq. in. and a hydrogen to carbon monoxide ratio of about 1–2:1.

12. The process as claimed in claim 2 wherein the oxygenated organic compounds are hydrogenated in the presence of a catalyst consisting essentially of a compound selected from the group consisting of nickel and oxides and sulfides of chromium, molybdenum and tungsten at temperatures between about 400 and 700° F., pressures between about 50 to 250 lbs. per sq. in. and space velocities between about 0.5 to 5.0 v./v./hr.

13. The process as claimed in claim 2 wherein not more than about 98% of the hydrogen supplied to the synthesis is converted in said synthesis.

14. The process of producing alcohols from carbon monoxide and hydrogen which comprises contacting a gas mixture containing about 2 mols of hydrogen per mol of carbon monoxide with a synthesis catalyst consisting essentially of reduced iron oxide promoted with potassium carbonate at a temperature of about 650° F., a pressure of about 250 lbs. per sq. in., a throughput of about 5100–5200 v./v./hr. and a recycle ratio of about 1.3:1 to produce hydrocarbons, water and oxygenated compounds, separating normally liquid products from spent synthesis gas, separating normally liquid hydrocarbons from an aqueous layer containing said oxygenated compounds, separating said oxygenated compounds from water, hydrogenating said separated oxygenated compounds in the presence of a nickel catalyst with separated spent synthesis gas at a temperature of about 450° F., a pressure of about 150 lbs. per sq. in. and a throughput of about 1 v./v./hr. to produce alcohols from more highly oxygenated organic compounds, and recovering alcohols from the hydrogenated product.

15. In the process of producing alcohols from carbon monoxide and hydrogen by contacting a gas mixture containing carbon monoxide and hydrogen in synthesis proportions at synthesis conditions with a synthesis catalyst to produce major proportions of normally liquid hydrocarbons, minor proportions of oxygenated organic compounds and a spent synthesis gas rich in hydrogen, the improvement which comprises separating normally liquid hydrocarbons and oxygenated compounds from said spent synthesis gas, separating normally liquid hydrocarbons from oxygenated organic compounds, hydrogenating the separated organic compounds with separated spent synthesis gas in the presence of a hydrogenation catalyst at hydrogenation conditions to produce alcohols from more highly oxygenated organic compounds, and recovering alcohols from the hydrogenated product.

CLINTON H. HOLDER.

REFERENCES CITED

The following references are of record in the file of this patent:

UNITED STATES PATENTS

| Number | Name | Date |
|---|---|---|
| 1,684,640 | Schmidt et al. | Sept. 18, 1928 |
| 1,984,380 | Odell | Dec. 18, 1934 |
| 2,059,495 | Smeykal | Nov. 3, 1936 |
| 2,099,475 | Giesen et al. | Nov. 16, 1937 |
| 2,171,324 | Zetzsche et al. | Aug. 29, 1939 |
| 2,257,457 | Fischer et al. | Sept. 30, 1941 |

FOREIGN PATENTS

| Number | Country | Date |
|---|---|---|
| 794,621 | France | Dec. 12, 1935 |